United States Patent [19]
Riess

[11] Patent Number: 5,988,340
[45] Date of Patent: Nov. 23, 1999

[54] TWO COMPONENTS OF A CYLINDER FOR A HYDRAULICALLY OPERATED FRICTION CLUTCH ASSEMBLY HAVING SCORED RUNNING SURFACE FOR MINIMIZING NOISE

[75] Inventor: Thomas Riess, Rottelsdorf, Germany

[73] Assignee: Fichtel & Sachs AG, Germany

[21] Appl. No.: 08/895,770

[22] Filed: Jul. 17, 1997

[30] Foreign Application Priority Data

Jul. 20, 1996 [DE] Germany ............................ 196 29 348

[51] Int. Cl.⁶ .............................. F16D 25/08; F16D 23/14
[52] U.S. Cl. ..................... 192/85 C; 192/91 A; 92/97; 92/169.1; 277/439; 277/549
[58] Field of Search ................................ 192/91 A, 85 C, 192/85 CA; 92/169.1, 107; 277/549, 559, 563, 571, 436–439; 451/51; 29/888.06, 888.061, 888.04, 888.041

[56] References Cited

U.S. PATENT DOCUMENTS

| | | | |
|---|---|---|---|
| 3,586,340 | 6/1971 | Otto | 277/559 X |
| 3,808,955 | 5/1974 | Hamada et al. | 92/169.1 |
| 4,429,531 | 2/1984 | Spielman | 92/169.1 X |
| 4,577,549 | 3/1986 | Frank et al. | 92/169.1 |
| 4,660,694 | 4/1987 | Nix et al. | 192/91 A X |
| 4,821,627 | 4/1989 | Leigh-Monstevens | 192/91 A X |
| 5,155,944 | 10/1992 | Nagel et al. | 451/51 |
| 5,287,951 | 2/1994 | Voit et al. | 192/85 CA |
| 5,307,915 | 5/1994 | Grosspietsch et al. | 192/91 A X |
| 5,331,775 | 7/1994 | Carmichael et al. | 451/51 |
| 5,590,887 | 1/1997 | Senda et al. | 277/436 |

FOREIGN PATENT DOCUMENTS 9417852  2/1995  Germany .

OTHER PUBLICATIONS

Metals Handbook, 9th ed. United States, ASM international, 1989. pp. 472–473. TA459.M43 1978, Mar. 1989.

Lueger Lexikon der Technik, Fertigungstechnik und Arbeitsmaschinen [Lueger Lexicon of Engineering, Manufacturing Technology and Machines], vol. 2, pp. 442 and 443, published by Rowohlt Taschenbuch Verlag in Jul. 1972.

Fachkunde für Metallberufe [Matalworking Handbook], 44th Edition, pp. 424 and 425, published by Verlage Europa–Lehrmittel in 1981.

"Honen" [Honing], publication issued with Publication No. 103.7,64 published by Nagel, in particular pp. 5 to 9 and 56 to 59, whch, according to the attached verification by Nagel, was published in 1964.

Handbuch der Fertigungstechnik [Manufacturing Engineering Handbook], edited by Günter Spur and Theodor Stöferle, vol. 3/2, in particular pp. 298 to 301, 327 and 357 to 360, published by Carl Hanser Verlag in 1980.

ATE Bremsen–Handbuch [ATE Brake Handbook], pp. 67 and 68, published by Bartsch Verlag in 1979.

(List continued on next page.)

*Primary Examiner*—Rodney H. Bonck
*Assistant Examiner*—Ankur Parekh
*Attorney, Agent, or Firm*—Nils H. Ljungman & Associates

[57] ABSTRACT

This invention relates to a seal between two components which two components can move relative to one another. The seal can be used in particular for hydraulic, pneumatic or hydropneumatic systems, whereby at least one elastic seal element interacts with a running surface. Preferably, this seal is used between a piston-shaped part and a cylinder-shaped part. In any case, the running surface, which running surface is mobile relative to the gasket, is provided with depressions. The depressions in the running surface, which running surface interacts with the gasket, form a cross-hatched pattern.

17 Claims, 4 Drawing Sheets

OTHER PUBLICATIONS

"Superfinish—eine neue Schleifmitteltechnologie" [Superfinish—a new abrasive technology], reprinted from vol. 9, No. 85 of the technical journal "Galvanotechnik", which according to the attached verification was published by Eugene G. Leuze Verlag in 1994.

Photographic documents with numbers 6637–2, 6637–5, 6637–6 and 6637–11, which according to the enclosed verification from Nagel show a Superfinish Machine, Model 4 SCE 80 T, which has been used since 1989.

Prototype Test Report (Exhibit OV1), issued by the VW company on Jun. 5, 1992, with assembly drawing dated May 2, 1989 (Exhibit OV2).

Maschinenfabrik Gehring KG. Stuttgan–Nellingen, Funktionsablauf der elektrischen Steuerung nach Schalplan 12 15–59, pp. 11–13 and Table of Contents.

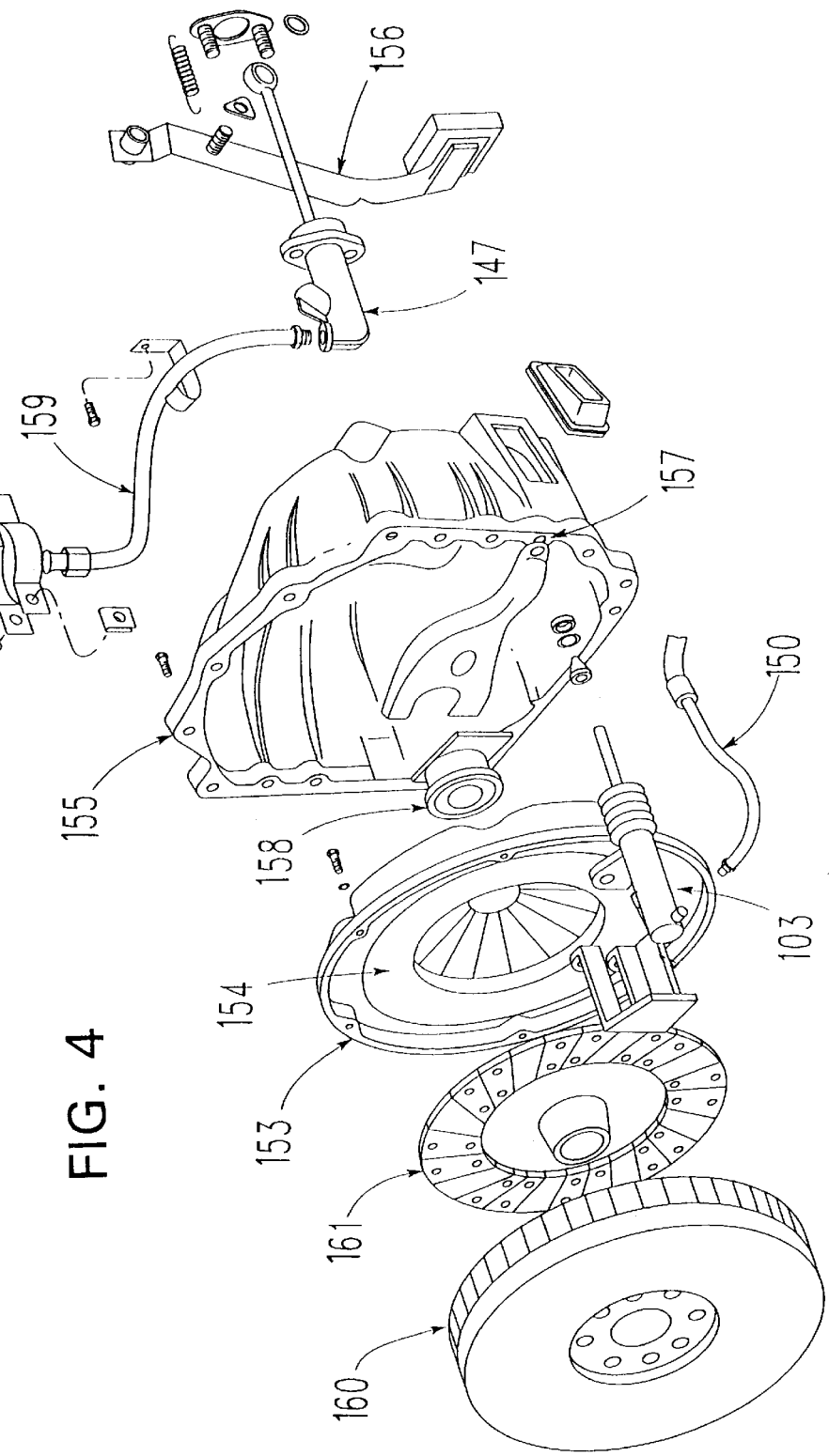

TWO COMPONENTS OF A CYLINDER FOR A HYDRAULICALLY OPERATED FRICTION CLUTCH ASSEMBLY HAVING SCORED RUNNING SURFACE FOR MINIMIZING NOISE

BACKGROUND OF THE INVENTION

1. Field of the Invention

The present invention relates to a seal between two components, which two components can move relative to one another, in particular for hydraulic, pneumatic or hydropneumatic systems, for example in a master cylinder for a hydraulically-operated friction clutch. At least one elastic seal element interacts with a running surface and preferably forms the seal between a piston-shaped part and a cylinder-shaped part. Also, the running surface, which running surface is mobile or movable relative to the gasket or gaskets, is provided with depressions.

2. Background Information

In systems of the types described above, a relative movement between an elastic gasket and the conventional surfaces frequently generates noise on account of the stick-slip effect, for example when the seal lip of the gasket is simultaneously being subjected to stress and relaxed over the entire periphery of a surface, which surface is either smooth or can also be grooved. The high-frequency slipping noises which are generated significantly reduce comfort in automotive applications or operations, for example, and are therefore frequently the cause of warranty claims.

These slipping noises can generally be prevented by lubricating the running surface of the gasket using a special lubricant, but this lubricant becomes less effective as the number of actuations increases, which means that the generation of noise cannot be prevented permanently. Nor does an increase in the surface roughness achieve the desired objective, in particular because such an approach increases wear and reduces efficiency.

OBJECT OF THE INVENTION

The object of the invention is to create a seal between two components, which two components move relative to one another, and which seal: permanently prevents the generation of noise; ensures a correct sealing action; is easy and economical to manufacture; and is highly effective.

SUMMARY OF THE INVENTION

The present invention teaches that this object can be accomplished by means of depressions in the running surface which running surface interacts with the gasket or axis, which depressions form an intersecting, or cruciform, or cross-hatched, or criss-cross pattern, or structure. As a result of this layout of depressions, in the event of movement of the surface to be sealed relative to the running surface, no additional measures are required to prevent the generation of noise, because the natural stress status along the periphery of the seal edge, which seal edge is preferably formed by a seal lip, varies greatly during the translation movement.

In other words, the cross-hatched or criss-cross pattern of the depressions varies the stress status between the two components such that noise is not generated. This, in turn, eliminates the need for additional noise-reducing measures, such as lubricants, to be used. Lubricants eventually become less effective over time and noise may begin to generate. The cross-hatched or criss-cross pattern may permanently prevent noise from being generated between the two components.

The creation of the depressions by a grinding process is very easy and economical, because the grinding process channels in sets of parallel lines, which depressions intersect one another to form a grid-like or criss-cross pattern on the surface, and this grid-like pattern is preferably created by a belt grinding process. A particularly favorable seal and one which guarantees long-term quiet operation is a seal in which the angle of intersection of the depressions is approximately 90 degrees. The respective depressions are preferably oriented on the running surface so that the depressions run at an angle of approximately 45 degrees with respect to the seal edge.

In master cylinders in particular, according to one characteristic of the invention, it is very favorable if the depressions are created in the piston-shaped part and the gaskets are realized in the form of lip seals. It is also possible, however, to locate the depressions in the housing, if the gasket sits on the piston. The depressions are oriented at an angle of approximately 45 degrees with respect to the seal edge in an intersecting, or cruciform, or criss-cross, or cross-hatched grid pattern on the surface over which surface the gasket slides. The dimensions of the intersecting depressions approximately correspond to a roughness, which roughness is conventional for a running surface, i.e. the depressions do not cause any loss in efficiency or any increased wear.

In other words, the intersecting depressions are extremely shallow and are visible only as finely scored lines on the running surface. As a result of the low surface roughness on the running surface, there is no loss in the effectiveness of the seal and no increased wear.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Several embodiments of the current invention are described in greater detail below with reference to the attached drawings wherein;

FIGS. 3 and 4 each show examples of hydraulically operated clutch assemblies.

DESCRIPTION OF THE PREFERRED EMBODIMENT

Figure 1:
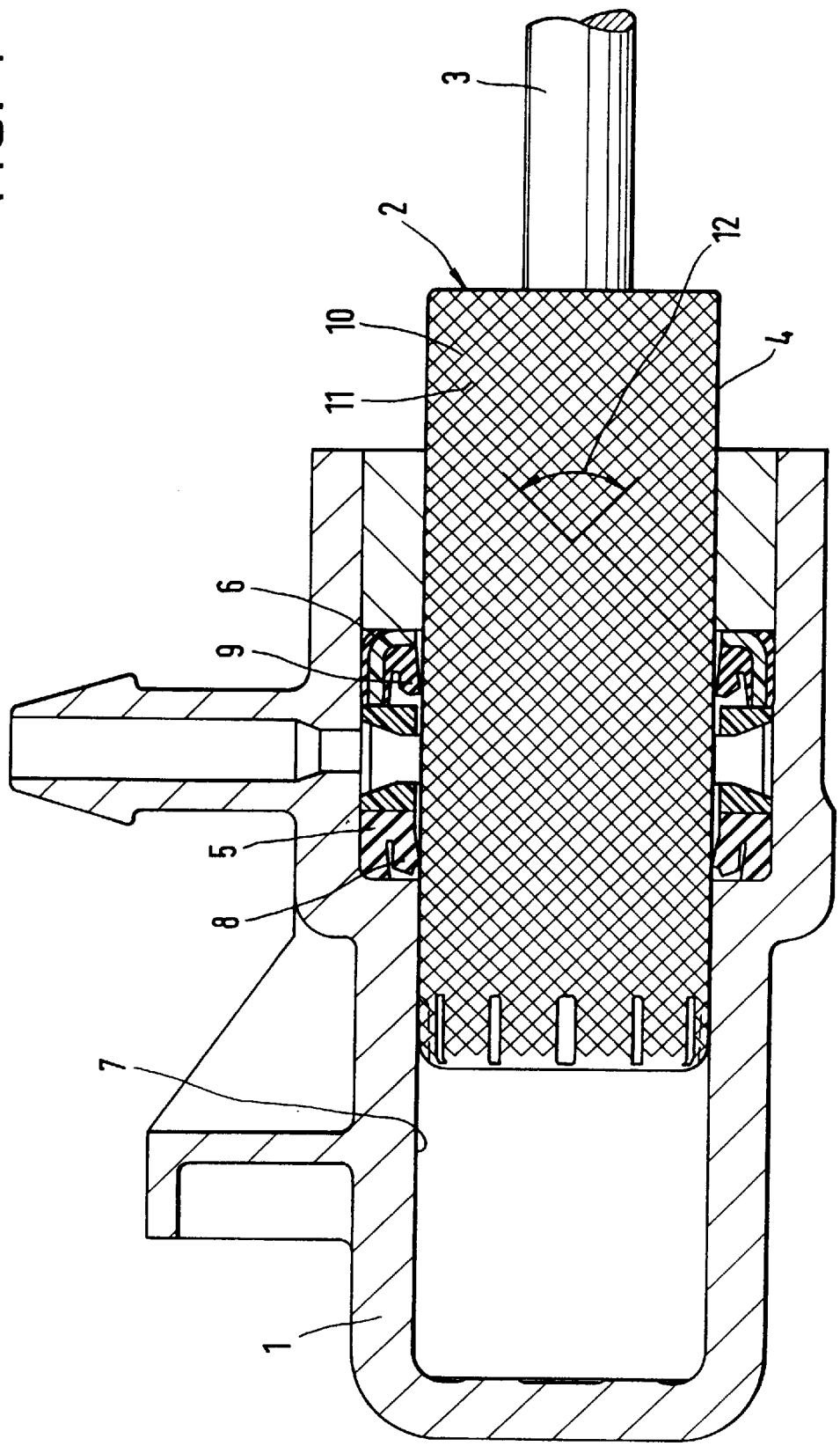
FIG. 1 shows an example of the seal on a piston-cylinder unit of a master cylinder, where the depressions are created on the piston-shaped part and the gaskets are realized in the form of seal lips.

FIG. 1 shows the seal on a piston-cylinder unit of a master cylinder. A housing 1 has a cylindrical internal surface 7 which internal surface 7 interacts with a running surface 4 of a piston 2, which piston 2 is connected to a piston rod 3. Two gaskets 5 and 6 interact by means of seal lips 8 and 9 to create a seal with respect to the running surface or contact surface 4 of the piston 2. This running surface 4 is provided with intersecting depressions 10 and 11, whereby the depressions 10 run from the upper left to the lower right and are oriented parallel to one another, while the depressions 11 also run parallel to one another from the lower left to the upper right. These depressions 10 and 11, which depressions 10, 11 are arranged in a grid-like pattern, intersect one another at an angle 12, which angle 12 is preferably approximately 90 degrees, and the depressions 10, 11 form respective angles of approximately 45 degrees with the seal edges of the seal lips 8 and 9. The depressions 10 and 11 are preferably created by a grinding process, and form an easily visible intersecting structure which intersecting structure has a surface roughness which roughness is conventional for running surfaces. Accordingly the depressions 10, which depressions 10 run parallel to one another and the depressions 11, which depressions 11 also run parallel to one another are visible only as fine scored lines, i.e. as extremely shallow depressions, on the running surface 4 of the piston 2, which piston 2 is generally made of metal. As a result of the low surface roughness, this seal neither adversely effects the effectiveness of the seal nor increases wear. The intersecting depressions 10 and 11 can advantageously be created by an easy and economical belt grinding process.

In other words, the depth of the depressions 10, 11 can be extremely shallow, in fact the depth of the depressions 10, 11 can be less than the width of the depressions 10, 11. The depth of the depressions 10, 11 can be, for example, about: 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.1 mm, 5.2 mm, 5.3 mm, 5.4 mm, 5.5 mm, 5.6 mm, 5.7 mm, 5.8 mm, 5.9 mm, 6.0 mm, 6.1 mm, 6.2 mm, 6.3 mm, 6.4 mm, 6.5 mm, 6.6 mm, 6.7 mm, 6.8 mm, 6.9 mm, 7.0 mm, 7.1 mm, 7.2 mm, 7.3 mm, 7.4 mm, 7.5 mm, 7.6 mm, 7.7 mm, 7.8 mm, 7.9 mm, 8.0 mm, 8.1 mm, 8.2 mm, 8.3 mm, 8.4 mm, 8.5 mm, 8.6 mm, 8.7 mm, 8.8 mm, 8.9 mm, 9.0 mm, 9.1 mm, 9.2 mm, 9.3 mm, 9.4 mm, 9.5 mm, 9.6 mm, 9.7 mm, 9.8 mm, 9.9 mm, or 10.0 mm.

FIG. 1 is essentially a schematic representation of the present invention. The depressions 10, which depressions 10 run parallel to one another, and the depressions 11, which depressions 11 run parallel to one another, can be an extremely short distance apart. In fact, the parallel depressions 10, and the parallel depressions 11, can be spaced so that the distance between the parallel depressions 10 and the distance between the parallel depressions 11 is less than the width of the depressions 10, 11. For example, the distance between the parallel depressions 10, and the distance between the parallel depressions 11 can be, for example, about: 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.1 mm, 5.2 mm, 5.3 mm, 5.4 mm, 5.5 mm, 5.6 mm, 5.7 mm, 5.8 mm, 5.9 mm, 6.0 mm, 6.1 mm, 6.2 mm, 6.3 mm, 6.4 mm, 6.5 mm, 6.6 mm, 6.7 mm, 6.8 mm, 6.9 mm, 7.0 mm, 7.1 mm, 7.2 mm, 7.3 mm, 7.4 mm, 7.5 mm, 7.6 mm, 7.7 mm, 7.8 mm, 7.9 mm, 8.0 mm, 8.1 mm, 8.2 mm, 8.3 mm, 8.4 mm, 8.5 mm, 8.6 mm, 8.7 mm, 8.8 mm, 8.9 mm, 9.0 mm, 9.1 mm, 9.2 mm, 9.3 mm, 9.4 mm, 9.5 mm, 9.6 mm, 9.7 mm, 9.8 mm, 9.9 mm, or 10.0 mm.

As a result of the intersecting structure formed by the depressions 10 and 11 on the running surface 4 of the piston 2, there is no generation of vibrations in the gaskets 5, because the natural stress conditions along the periphery of the seal lips 8 and 9 vary greatly during the displacement movement. It is therefore possible to ensure the long-term elimination of seal noises.

The seal described above is not only suitable for use on a master cylinder. The intersecting pattern or structure can also be used as appropriate on the interior surface of a cylinder, in which case the piston supports the gasket. It is also possible to use a corresponding piston rod gasket, in which case the piston rod is provided with the intersecting pattern or structure, and the piston rod gasket is located in a piston rod guide. In such a case, it is apparent that the seal claimed by the invention can be modified for a wide variety of sealing applications, and can thereby prevent the undesirable generation of noise.

Figure 2:
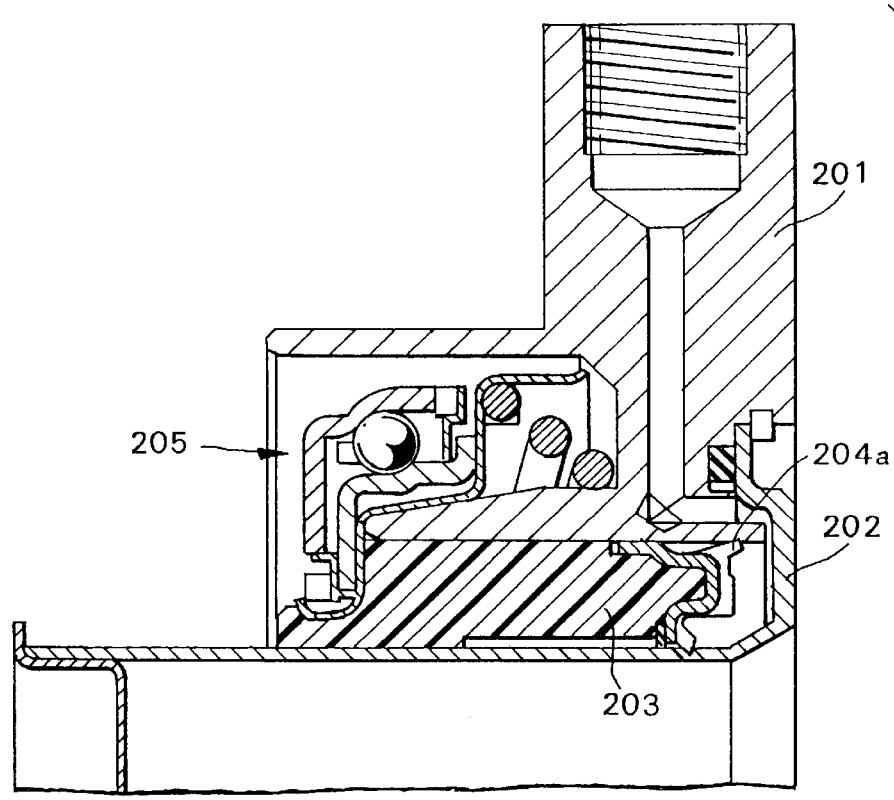
FIG. 2 shows an example of a piston-cylinder unit of a master cylinder with the gasket located on the piston-shaped part.
Figure 2:
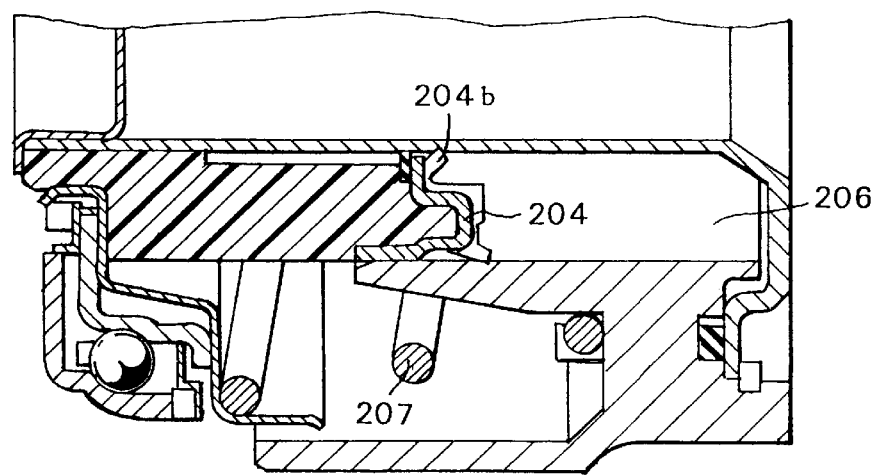

FIG. 2 shows an example of a cylinder for the actuation of a hydraulic motor vehicle clutch with the gasket located on the piston-shaped part, which cylinder consists essentially of a cylinder housing 201, a cylinder jacket 202 located concentrically in it, an annular piston or ring piston 203, a seal element 204 and a release bearing or thrust bearing 205. Between the cylinder housing 201 and the cylinder jacket 202 there is an annular chamber 206 in which the annular piston 203 is guided so that the annular piston 203 can move axially. The release bearing or thrust bearing 205, to which release bearing 205 a bias is applied by a compression spring 207, sits on the annular piston 203 and is axially displaced with the annular piston 203, to release the clutch.

On the end of the cylinder which end is located farther from the clutch (the clutch is not shown in the drawing), the seal element 204 is attached axially to the annular piston 203. The connection between the seal element 204 and the annular piston 203 is preferably created by means of an interference fit. The annular piston 203 is sealed both radially outward with respect to the cylinder housing 201, and radially inwardly with respect to the cylinder jacket 202 by means of the seal element 204. The surfaces of the cylinder housing 201 and cylinder jacket 202 can be provided with intersecting depressions (such as shown in FIG. 1) which depressions can be arranged in a grid-like pattern to form respective angles of approximately 45 degrees with the seal edges of seal lips 204a and 204b.

Figure 3:
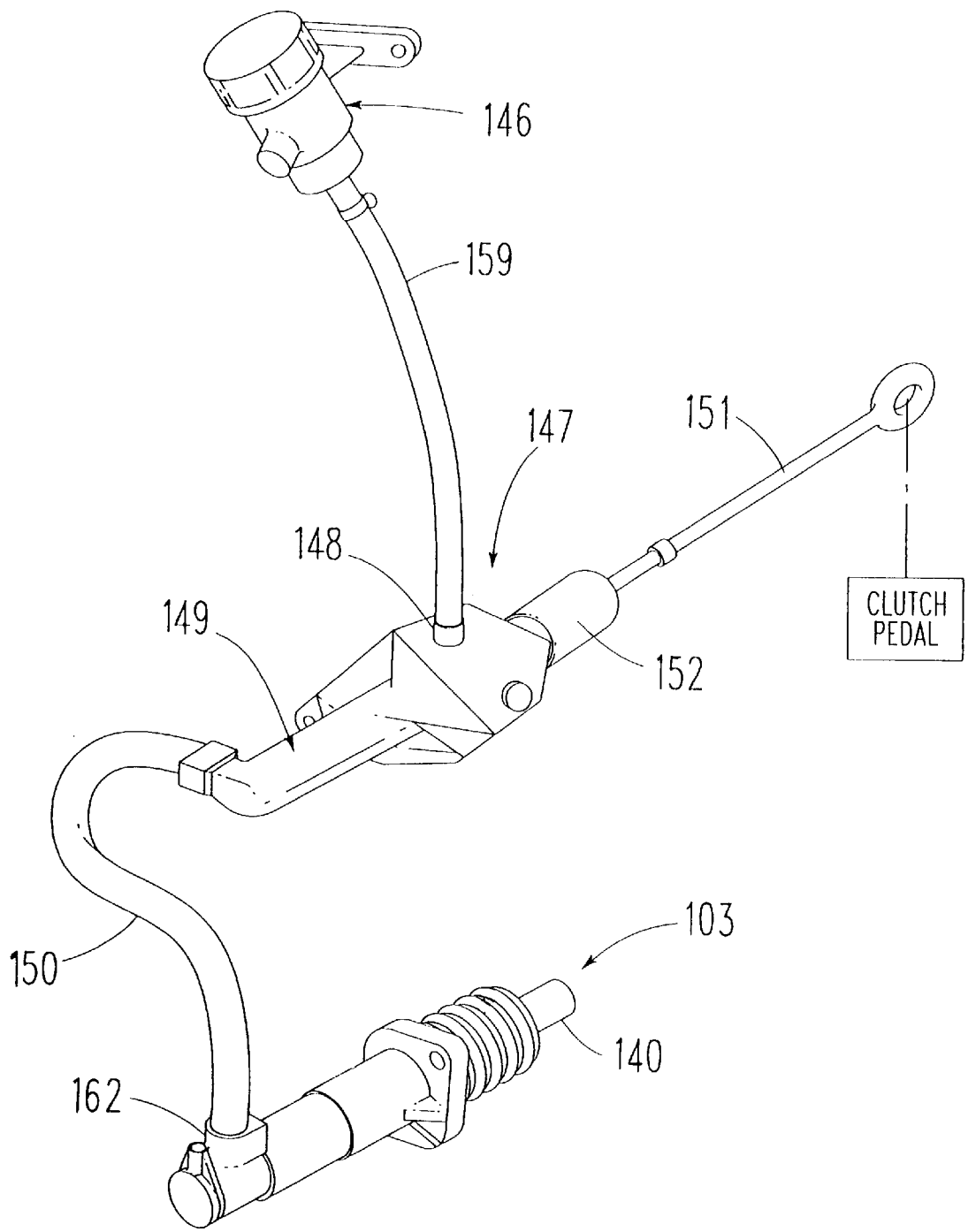

FIG. 3 essentially shows a hydraulic clutch system which system could utilize the present invention. Such a system can preferably have a remote fluid reservoir 146 and a clutch master cylinder 147, the two being connected to one another by means of a line 159. The clutch master cylinder 147 can preferably be mounted opposite the dash of a motor vehicle, i.e. near the floor where the operator's feet would be, and can preferably be operated essentially directly off of the clutch pedal of the vehicle, preferably by means of a push rod 151, the clutch pedal being shown schematically in FIG. 3. In addition, the master cylinder 147 can also have a protective boot 152. A cylinder or servant cylinder 103 can preferably be mounted by means of a fastening connection (not shown in FIG. 3) on a clutch housing 155 (see FIG. 4). A connecting element 140 can preferably be attached to a clutch release fork or throwout lever 157 (see FIG. 4).

The clutch master cylinder 147, in accordance with the embodiment shown in FIG. 3, preferably operates as the pump for pumping hydraulic fluid from reservoir 146, via a connection 148 and cylinder 149, to the servant cylinder 103. The piston rod (not shown here) of the master cylinder 147 can preferably be operatively attached to the clutch pedal by means of push rod 151, hydraulic fluid can be received from reservoir 146, and a connection 162 can be used to provide hydraulic fluid, via line 150, to the servant cylinder 103. When the clutch pedal is depressed, hydraulic fluid under pressure can be pumped into the servant cylinder 103, via the line 150, and can cause the piston rod (not shown) of the servant cylinder 103 to extend. The outer end of the piston rod of the servant cylinder 103 can cause the clutch release fork 157 to pivot and force a clutch release bearing 158 (see FIG. 4) to disengage the clutch. Since hydraulic systems are generally self-adjusting, when the clutch pedal is released, hydraulic pressure can fall off, and the piston rod of the servant cylinder 103 can withdraw.

FIG. 4 shows a more complete hydraulic clutch system including a flywheel 160, a clutch disc 161, a clutch cover 153 having a movable pressure plate 154 disposed therein, and a clutch housing 155. In addition, the clutch system can also include a throwout or release bearing 158 and a clutch release fork or throwout lever 157, which release fork 157 can preferably be operatively attached to the servant cylinder 103. The servant cylinder 103 can preferably be connected, via line 150, to the master cylinder 147, the actual connection of which is not shown here for purposes of simplicity. As discussed above, the master cylinder 147 can preferably be connected to the clutch pedal 156, and to the reservoir 146 by means of line 159.

The figures represent otherwise identical or functionally identical components with the same reference numbers.

One feature of the invention resides broadly in the seal between two components which two components can move relative to one another, in particular for hydraulic, pneumatic or hydropneumatic systems, whereby at least one elastic seal element 5, 6 interacts with a running or bearing surface 4 and preferably forms the seal between a piston-shaped part 2 and a cylinder-shaped part 7. The running surface or contact surface 4, which running surface 4 is mobile relative to the gasket or gaskets, or seal or seals 5, 6, is provided with depressions 10, 11, characterized by the fact that the depressions 10, 11 in the running surface 4, which running surface 4 interacts with the gasket or gaskets 5, 6, form a cross-hatched or cross-shaped or cruciform pattern or structure.

Another feature of the invention resides broadly in the seal characterized by the fact that the structure of the depressions 10, 11 is formed by two sets of channels, or lines, or scored lines, which channels run at right angles to one another and are parallel to one another within each set of channels.

Yet another feature of the invention resides broadly in the seal characterized by the fact that the angle of intersection 12 of the depressions 10, 11 is approximately 90 degrees.

Still another feature of the invention resides broadly in the seal characterized by the fact that the depressions 10 which run parallel to one another are formed by sets of parallel scored lines which run at right angles to one another.

A further feature of the invention resides broadly in the seal characterized by the fact that the ground lines which intersect one another are formed by an abrasive belt grinding process.

Another feature of the invention resides broadly in the seal characterized by the fact that the depressions 10, 11 are each oriented at an angle of approximately 45 degrees to the sealing corners seal lips 8, 9 of the gaskets 5, 6.

Yet another feature of the invention resides broadly in the seal characterized by the fact that the depressions 10, 11 are located in the piston-shaped part 2 and the gaskets 5, 6 are realized in the form of lip seals 8, 9.

Still another feature of the invention resides broadly in the seal characterized by the fact that the depressions 10, 11 are realized so that they are extremely shallow, like those which are created from a grinding, or chattering process, like those which are created by tool marks.

A further feature of the invention resides broadly in the seal characterized by the fact that the depressions 10, 11 which are oriented parallel to one another are separated from one another by an extremely short distance.

One example of a hydraulic master and slave cylinder which could possibly utilize the present invention is disclosed by the U.S. Patent Application filed on May 20, 1997, entitled "A Hydraulical Cylinder such as a Clutch Master or Servant Cylinder in a Motor Vehicle Having a Bleed Element", having inventors Thomas Reiss, Olaf Pagels, Boleslaw Tulaczko and Wolfgang Grosspietsch, having Attorney Docket No. NHL-FIS-298, and Ser. No. 08/859, 151, which application claims priority German Application No. 196 48 683.1, filed on Nov. 25, 1996, and inner priority from German Application No. 196 10 188.8, filed on May 20, 1996.

Some examples of hydraulic master and slave cylinders which could possibly utilize the present invention are disclosed by the following U.S. Patent Applications: Ser. No. 08/389,012 to Grosspietsch et al. which is now abandoned, entitled "Cylinder with Plug-in Connection"; Ser. No. 08/428,700 to Link et al. which is now U.S. Pat. No. 5,638,934, entitled "Hydraulic System with a Multiplicity of Cylinders"; Ser. No. 08/561,288 to Grosspietsch et al. which is now U.S. Pat. No. 5,704,462, entitled "Cylinder for Hydraulic Systems, in particular for Motor Vehicles".

Some examples of clutch assemblies and various components associated therewith which could possibly utilize the present invention may be disclosed in the following U.S. Patents: U.S. Pat. No. 5,211,099 to Grosspietsch et al., entitled "Slave Cylinder for a Hydraulic Actuating System of a Motor Vehicle Friction Clutch"; U.S. Pat. No. 4,745,999 to Brugger et al., entitled "Clutch Operating Cylinder for a Pressure-Medium Operated Clutch"; U.S. Pat. No. 4,807, 731 to Collins entitled "Clutch and Brake Assembly"; and U.S. Pat. No. 4,637,505 to Huber entitled "Fluid-Operated Clutch Disengaging Apparatus".

Some examples of hydraulic clutch systems which could possibly utilize the present invention are disclosed by the following U.S. Patents, each of which is assigned to the assignee of the present invention: U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

Some examples of cross-hatching which could be used in the context of the present invention could include: U.S. Pat. No. 5,016,090 to Galyon et al., dated May 14, 1991 and entitled "Cross-Hatch Flow Distribution and Applications thereof"; U.S. Pat. No. 5,186,135 to Kovach, dated Feb. 16, 1993 and entitled "Valve Stem Topographical Optimization Process"; and U.S. Pat. No. 5,379,686 to Silva dated Jan. 10, 1995 and entitled "Rotisserie Apparatus".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, hereby incorporated by reference as if set forth in their entirety herein.

The corresponding foreign patent publication applications, namely, Federal Republic of Germany Patent Application No. 196 29 348.0, filed on Jul. 20, 1996, having inventor Thomas Riess, and DE-OS 196 29 348.0 and DE-PS 196 29 348.0, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A piston-cylinder arrangement for a hydraulic system in a motor vehicle comprising:

a cylinder, said cylinder comprising a first end and a second end and defining a chamber therein, at least a portion of said chamber being configured to hold hydraulic fluid therein;

said cylinder having a longitudinal axis;

said cylinder comprising a housing;

said cylinder housing comprising a surface;

a piston, said piston being disposed to extend into said chamber;

said piston being disposed to slide axially substantially parallel to the longitudinal axis;

said piston comprising a surface;

a contact surface, said contact surface being disposed on said surface of one of: said cylinder housing and said piston;

said contact surface comprising a first set of depressions and a second set of depressions;

said first set of depressions comprising a first plurality of substantially parallel channels;

each of said first plurality of substantially parallel channels having side walls;

said second set of depressions comprising a second plurality of substantially parallel channels;

each of said second plurality of substantially parallel channels having side walls;

said first plurality of substantially parallel channels being disposed to intersect said second plurality of substantially parallel channels at angles one with respect to the other producing a cross-hatched pattern configured to minimize noise and to maximize sealing action of said piston-cylinder arrangement;

a structure being disposed to slidingly contact said contact surface of one of: said cylinder housing and said piston, to seal said chamber; and a pressure medium connection for providing hydraulic fluid to said chamber.

2. The piston-cylinder arrangement according to claim 1 comprising:

a plurality of angles of intersection, said plurality of angles of intersection being disposed at the intersections between said first set of depressions and said second set of depressions; and said plurality of angles of intersection each being approximately 90°.

3. The piston-cylinder arrangement according to claim 2 wherein said plurality of channels of said first set of depressions and said plurality of channels of said second set of depressions each comprise belt ground lines.

4. The piston-cylinder arrangement according to claim 3 wherein:

said sealing structure comprises at least two seal lips;

said at least two seal lips being disposed to slidingly contact said contact surface;

a plurality of contact angles, said plurality of contact angles being formed by the intersection of said first plurality of channels and said second plurality of channels with a straight line on the surface of the piston, parallel to an axis of the piston;

said plurality of contact angles being disposed adjacent said at least two seal lips; and said plurality of contact angles each being approximately 45°.

5. The piston-cylinder arrangement according to claim 4 wherein:

each of said plurality of substantially parallel channels of said first set of depressions comprises a width dimension;

said width dimension of each of said plurality of substantially parallel channels of said first set of depressions being disposed in a direction substantially parallel to said plurality of substantially parallel channels of said second set of depressions;

each of said plurality of substantially parallel channels of said first set of depressions comprises a depth dimension;

said depth dimension of each of said plurality of substantially parallel channels of said first set of depressions being disposed to extend into said contact surface;

said depth dimension of each of said plurality of substantially parallel channels of said first set of depressions being disposed to be smaller than the width dimension of each of said plurality of substantially parallel channels of said first set of depressions;

each of said plurality of substantially parallel channels of said second set of depressions comprises a width dimension;

said width dimension of each of said plurality of substantially parallel channels of said second set of depressions being disposed in a direction substantially parallel to said plurality of substantially parallel channels of said first set of depressions;

each of said plurality of substantially parallel channels of said second set of depressions comprises a depth dimension;

said depth dimension of each of said plurality of substantially parallel channels of said second set of depressions being disposed to extend into said contact surface; and said depth dimension of each of said plurality of substantially parallel channels of said second set of depressions being disposed to be smaller than the width dimension of each of said plurality of substantially parallel channels of said second set of depressions.

6. The piston-cylinder arrangement according to claim 5 wherein:

the distance between each of said plurality of substantially parallel channels of said first set of depressions is smaller than the width dimension of each of said plurality of substantially parallel channels of said first set of depressions; and the distance between each of said plurality of substantially parallel channels of said second set of depressions is smaller than the width dimension of each of said plurality of substantially parallel channels of said second set of depressions.

7. A piston-cylinder arrangement for a hydraulic system in a motor vehicle, said piston-cylinder arrangement comprising:

a hydraulic actuator, said hydraulic actuator comprising:
a cylinder, said cylinder comprising a first end and a second end and defining a chamber therein; at least a portion of said chamber being configured to hold hydraulic fluid therein;
said cylinder having a longitudinal axis;
said cylinder comprising a housing;
said cylinder housing comprising a surface;
a piston, said piston being disposed to extend into said chamber;
said piston being disposed to slide axially substantially parallel to the longitudinal axis;
said piston comprising a surface;
a contact surface, said contact surface being disposed on said surface of one of: said cylinder housing and said piston;
said contact surface comprising a first set of depressions and a second set of depressions;
said first set of depressions comprising a first plurality of substantially parallel channels;
each of said first plurality of substantially parallel channels having side walls;
said second set of depressions comprising a second plurality of substantially parallel channels;
each of said second plurality of substantially parallel channels having side walls;
said first plurality of substantially parallel channels being disposed to intersect said second set of substantially parallel channels producing a cross-hatch pattern configured to minimize noise and to maximize sealing action of said piston-cylinder arrangement;
a plurality of angles of intersection, said plurality of angles of intersection being disposed at the intersections between said first plurality of channels and said second plurality of channels;
at least a portion of said angles of intersection comprising a substantial portion of 180°;
a structure being disposed to slidingly contact said contact surface of one of: said cylinder housing and said piston, to seal said chamber; and a pressure medium connection for providing hydraulic fluid to said chamber.

8. The piston-cylinder arrangement according to claim 7 wherein said plurality of angles of intersection each being approximately 90°.

9. The piston-cylinder arrangement according to claim 8 wherein said plurality of channels of said first set of depressions and said plurality of channels of said second set of depressions each comprise belt ground lines.

10. The piston-cylinder arrangement according to claim 9 wherein:

said sealing structure comprises at least two seal lips;

said at least two seal lips being disposed to slidingly contact said contact surface;

a plurality of contact angles, said plurality of contact angles being formed by the intersection of said first plurality of channels and said second plurality of channels with the plane normal to the piston and containing said seal lips;

said plurality of contact angles being disposed adjacent said at least two seal lips; and said plurality of contact angles each being approximately 45°.

11. The piston-cylinder arrangement according to claim 9 wherein:

each of said plurality of substantially parallel channels of said first set of depressions comprises a width dimension;

said width dimension of each of said plurality of substantially parallel channels of said first set of depressions being disposed in a direction substantially parallel to said plurality of substantially parallel channels of said second set of depressions;

each of said plurality of substantially parallel channels of said first set of depressions comprises a depth dimension;

said depth dimension of each of said plurality of substantially parallel channels of said first set of depressions being disposed to extend into said contact surface;

said depth dimension of each of said plurality of substantially parallel channels of said first set of depressions being disposed to be smaller than the width dimension of each of said plurality of substantially parallel channels of said first set of depressions;

each of said plurality of substantially parallel channels of said second set of depressions comprises a width dimension;

said width dimension of each of said plurality of substantially parallel channels of said second set of depressions being disposed in a direction substantially parallel to said plurality of substantially parallel channels of said first set of depressions;

each of said plurality of substantially parallel channels of said second set of depressions comprises a depth dimension;

said depth dimension of each of said plurality of substantially parallel channels of said second set of depression being disposed to extend into said contact surface; and said depth dimension of each of said plurality of substantially parallel channels of said second set of depressions being disposed to be smaller than the width dimension of each of said plurality of substantially parallel channels of said second set of depressions.

12. The piston-cylinder arrangement according to claim 11 wherein:

the distance between each of said plurality of substantially parallel channels of said first set of depressions is smaller than the width dimension of each of said plurality of substantially parallel channels of said first set of depressions; and the distance between each of said plurality of substantially parallel channels of said second set of depressions is smaller than the width dimension of each of said plurality of substantially parallel channels of said second set of depressions.

13. A seal between two components in a hydraulic clutch system, which two components can move relative to each other whereby at least one elastic seal element interacts with a running surface and preferably forms a seal between a piston-shaped part and a cylinder-shaped part, the at least one elastic seal element comprises at least one gasket, and the running surface which is mobile relative to the at least one gasket is provided with depressions, wherein the depressions in the running surface which interacts with the gasket or gaskets form a criss-cross pattern configured to minimize noise and to maximize sealing action of said seal, and the structure of the depressions is formed by two sets of channels which run at right angles to one another, and each channel in said two sets of channels comprises side walls, and each channel in one set of said two sets of channels is parallel to every other channel in said one set of said two sets.

14. Seal as claimed in claim 13, wherein the angle of intersection of the depressions is approximately 90 degrees.

15. Seal as claimed in claim 14, wherein the depressions which run parallel to one another are formed by sets of parallel scored lines which run at right angles to one another.

16. Seal as claimed in claim 15, wherein the ground lines which intersect one another are formed by an abrasive belt grinding process.

17. Seal as claimed in claim 16, wherein:

the depressions are each oriented at an angle of approximately 45 degrees to the sealing corners of the gaskets; the depressions are located in the piston-shaped part and the gaskets are realized in the form of lip seals.

* * * * *

UNITED STATES PATENT AND TRADEMARK OFFICE
CERTIFICATE OF CORRECTION

PATENT NO. : 5,988,340
DATED : November 23, 1999
INVENTOR(S) : Thomas RIESS

It is certified that error appears in the above-identified patent and that said Letters Patent is hereby corrected as shown below:

On the title page, Item [54], in the title, before "TWO" insert --SEAL BETWEEN--.

On the title page, Item [56], under "OTHER PUBLICATIONS", line 7, 3rd publication, after 'Metallberufe', delete "[Matalworking" and insert --[Metalworking--.

In column 1, line 1 of the title, before 'TWO', insert --SEAL BETWEEN--.

In column 10, line 24, Claim 11, after 'claim', delete "9" and insert --10--.

Signed and Sealed this

Seventh Day of November, 2000

Attest:

Q. TODD DICKINSON

*Attesting Officer*  *Director of Patents and Trademarks*